April 5, 1960    W. G. KELLER    2,931,681
APPARATUS AND METHOD FOR HANDLING PASSENGERS
Filed Aug. 20, 1954
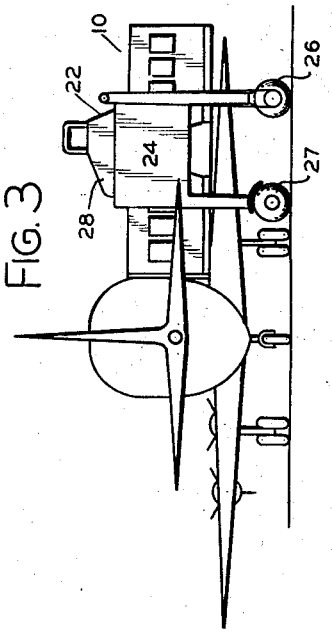
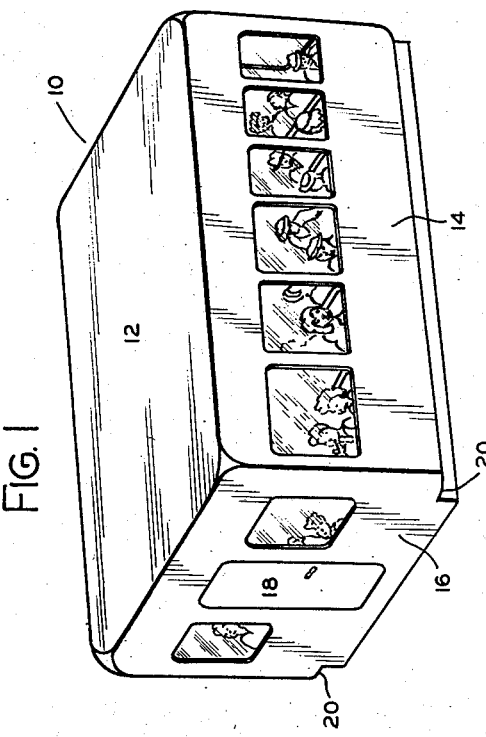
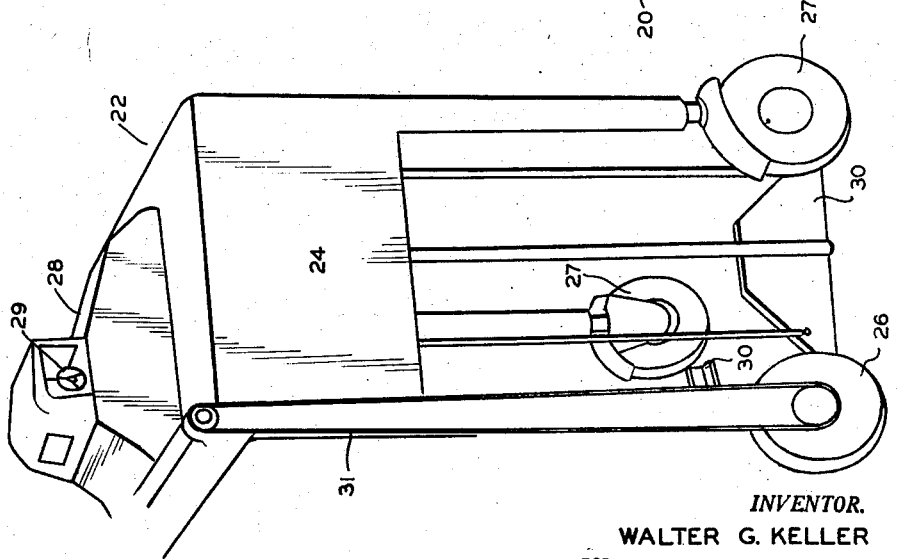
INVENTOR.
WALTER G. KELLER
BY Kenneth C. Witt
ATTY.

United States Patent Office 2,931,681
Patented Apr. 5, 1960

2,931,681

APPARATUS AND METHOD FOR HANDLING PASSENGERS

Walter G. Keller, Jackson, Mich., assignor to Clark Equipment Company, a Michigan corporation Application August 20, 1954, Serial No. 451,221

3 Claims. (Cl. 296—28)

This invention relates to apparatus and methods for handling passengers. The invention is particularly suited for handling aircraft passengers although it should be understood that it is not limited to the handling of aircraft passengers.

The handling of passengers such as those embarking on and debarking from airplanes presents enormous problems. Moreover, these problems daily are increasing in complexity because of the increasing number of passengers.

Taking the handling of aircraft passengers as an example, one of the major problems is the locating of an airplane close enough to the terminal to permit the unloading and loading of passengers on the airplane without an undue amount of travel between the terminal and the airplane. This problem has been solved up to now mainly by extending the terminal building, or covered runways from the terminal building, in various ways so as to be able to park the airplanes adjacent such a runway or extension of the terminal building. This, however, has created long walks for the aircraft passengers and furthermore has complicated greatly the maneuvering of airplanes on the ground.

Another problem in the handling of aircraft passengers is the long delays which are frequently encountered by waiting passengers after a plane has arrived, while the plane is being refueled, cleaned or other operations performed on it. It is necessary for reasons of safety and efficiency that the passengers be kept within the terminal building or behind some sort of barrier away from the airplane while it is being serviced. This produces inconvenience for the passengers and also increases the difficulties of the airlines in properly handling such passengers.

Another undesirable feature of the present handling of airplane passengers is that it is almost always necessary for the passengers to go out into the elements in order to go to or from an airplane. This, of course, is very undesirable under adverse weather conditions. Also, it is necesesary in almost all cases for the passengers to go up or down a stair which is external to the plane in order to enter or leave it.

The object of my invention is to provide a safe apparatus and method for handling passengers which eliminates these undesirable features.

A further object is to provide an apparatus and method for handling aircraft and other passengers more quickly, more efficiently, and at less expense.

In carrying out my invention in one preferred manner, I provide a portable elevator for the passengers. This may take the form of an enclosed passenger carrier which is transported and raised and lowered by a gantry truck. The portable elevator is loaded with passengers at the terminal, after which it is transported to the airplane and the passenger compartment raised up to the level of the airplane cabin. Then the passengers go directly from the elevated passenger compartment into the airplane. A different solution to the above stated problem is disclosed in U.S. Patent No. 2,885,242, issued to G. Spatta on May 5, 1959, filed on the same day as the present application and having a common assignee.

For a clearer and more complete understanding of my invention, reference should be had to the accompanying drawing in which:

Figure 1 is a perspective view showing a portable and detachable passenger carrier which may be used with a gantry truck or other vehicle to form a portable elevator, Figure 2 shows a partial view of a typical gantry truck suitable for handling the passenger carrier shown in Fig. 1, and Figure 3 illustrates the manner in which the portable elevator is positioned adjacent the airplane and raised to allow the passengers to enter or leave the portable elevator directly from the airplane.

In the drawing, the numeral 10 denotes generally a portable passenger carrier which may be utilized in my invention. As shown in Fig. 1, the passenger carrier 10 is completely enclosed, including a top surface 12, side surfaces 14, only one of which appears in the drawing, and end surfaces 16 only one of which is visible in the drawing. As shown, the side and end surfaces are provided with windows, and a door 18 is provided in at least one of the end surfaces. The passenger carrier also includes a floor portion which is not visible in the drawing.

The passenger carrier 10 is provided with seats for the passengers, and in addition may be provided with lights, heat, air conditioning and other facilities if desired. It will be understood that a suitable battery or other means may be incorporated in the passenger carrier to provide power for these facilities.

The passenger carrier also includes adapter means by which it may be picked up, transported, and elevated, and in the form of the invention described and illustrated herein these means take the form of shoulder portions 20 along opposite sides of the carrier 10.

In the present embodiment of my invention, the passenger carrier 10 is picked up, transported, and elevated by a gantry truck which is designated generally by the numeral 22. Gantry trucks of this type have been used for many years in the handling of materials such as lumber, steel shapes and the like. It should be understood, however, that my invention is not limited to this type of vehicle and that other types of vehicles may be employed for handling the passenger carrier, if desired. Also, other passenger carriers may be utilized and such carriers may be picked up and elevated by any means equivalent to the arrangement described in detail hereinafter. In other words my invention is not limited to the particular passenger carrier and means for transporting and elevating it which are described herein for purposes of illustration.

The gantry truck 22, or straddle carrier as it is frequently called, includes a vertically elongated self-propelled inverted U-shaped gantry frame 24 which is arranged to straddle the passenger carrier 10, the frame 24 forming an open pocket load engaging elevator means depending downwardly in the open pocket and being mounted on four wheels in the conventional manner. In the drawing the rear wheels are designated by the numeral 26 while the front wheels are labeled 27. Ordinarily, in a machine of this character the rear wheels are drive wheels and all four wheels are dirigible, and the machine illustrated is arranged in this manner. However, the straddle carrier may be provided with four drive wheels and/or two dirigible wheels if desired. The operator of the straddle carrier is located in a suitable compartment 28 on top of the straddle carrier. The engine or other propelling means likewise may be located in this compartment, along with hydraulic pumps and other accessories needed for the operation of the machine 22. Linkage means (not shown) are provided for connecting a steering wheel 29 in the operator's compartment with the dirigible wheels 26 and 27 for steering the vehicle 22. The chain drive means indicated schematically at 31, or other equivalent means, are provided for connecting the engine of the vehicle to the drive wheels 26.

As shown, the gantry truck 22 is provided with a pair of swing hooks 30. These hooks are controlled by the operator of the gantry truck in a known manner to move the hooks under the shoulder portions 20 of the carrier 10, after the truck 22 has been driven over the carrier 10 in order to straddle it. After the hooks 30 have been moved under the shoulder portions 20, the hooks are raised by the operator of the straddle carrier to raise the passenger carrier 10 off of the ground or other supporting surface an amount sufficient to clear the latter when the passenger carrier is transported. After picking up the passenger carrier, the vehicle 22 transports the passenger carrier and the passengers therein to a location adjacent the cabin of the airplane. Then the passenger carrier 10 is elevated by the gantry truck 22 under the control of the operator until it is at the level of an entrance door to the airplane as illustrated in Fig. 3. Then the passengers walk directly from the passenger carrier into the plane.

When passengers are disembarking from an airplane, the operation is the reverse of that just described. The passengers go from the plane into the passenger carrier which has been elevated adjacent the door of the plane. Then the passenger carrier is lowered and transported to the terminal or other location.

It will be understood that passenger carriers such as that illustrated in the drawing may be placed at suitable locations at an airport or other installation where passengers are handled. As the passengers enter the passenger carrier, they may be checked by a doorman or stewardess. The doorman or stewardess ordinarily takes the passengers' tickets, obtains their names, and performs other operations. In addition, it is possible, if desired, to number the seats in the passenger carrier to correspond to those in the aircraft or other conveyance to which the passengers are to be transported so that the passengers can have their seats assigned in advance. Later, after the passenger carrier has been transported to the aircraft or other means of conveyance in the manner described hereinbefore, the passengers can proceed immediately to their assigned seats in the aircraft.

An advantage of my method and apparatus is that the operations discussed in the preceding paragraph can be performed while the airplane is being refueled or otherwise prepared for departure. Moreover, it is possible in many cases to perform these operations before the airplane has arrived so that the passengers are ready to be transferred to the airplane without delay immediately upon its arrival.

By the use of the method and apparatus disclosed herein the handling of passengers may be facilitated greatly, with a reduction in the terminal facilities required. In fact, it is possible to eliminate the terminal entirely in certain instances where a relatively small amount of traffic is handled, for the passenger carrier itself can serve as the terminal. Where only a few passengers are handled, all of the operations necessary in taking care of the passengers can be performed in the passenger carrier and then when the plane or other conveyance arrives, the passengers can be transported to the plane in the portable elevator of which the passenger carrier forms a part.

At larger terminals, the terminal facilities can be readily reduced. If passenger carriers of the type disclosed herein are used, less space is needed as waiting rooms for the passengers because they can wait in the passenger carriers. Furthermore, it is not necessary to extend the terminal facilities long distances out adjacent the area where the planes are parked because the passenger carriers may be transported any reasonable distance in a very short time. For example, straddle carriers of the type illustrated at 22 frequently operate at speeds of 30 miles per hour and higher. Therefore, even if the plane were parked half a mile from the terminal, it would take only one minute to transport the passenger carrier from the terminal to the plane.

It will be readily apparent that handling passengers by the apparatus and method disclosed herein benefits both the passengers and the transportation company. Many delays inherent in the handling of passengers are avoided by this method and apparatus. The passengers need not wait in long lines while the plane is being serviced. Instead they can go immediately to a comfortable passenger carrier where their tickets can be taken and other credentials checked while the plane is being serviced.

The operator, on the other hand, can park the airplane or other conveyance at a convenient location somewhat remote from the terminal for refueling and other operations on it. Moreover, it is possible in many cases to avoid a great deal of the time which airplanes now spend in taxiing on the ground. If it is not necessary to service the plane during a particular stop, the passenger carrier can be transported out on the field to meet the plane at a realtively distant point, making it unnecessary for the plane to taxi into the terminal at all.

This invention promotes safety because it provides for the handling of passengers in an orderly manner. It keeps them at a safe distance from the aircraft before boarding, and removes them to a safe distance quickly after the aircraft has landed.

Another advantage of this method and apparatus is that one gantry truck or other vehicle may be used to handle several passenger carriers. The gantry truck is needed only for the actual conveying and elevating operation on a passenger carrier. While the passenger carrier is being loaded the gantry truck can be handling other assignments. Moreover, the same gantry truck which handles passenger carriers can be used for handling baggage, gasoline and many other things, thus keeping to a minimum the investment required in the operation of a terminal.

While I have described and illustrated herein an arrangement in which the passenger carrier is detachable from the vehicle, it will be understood that the passenger carrier equipment can be arranged as an integral part of the gantry truck or other vehicle to form a portable elevator.

Thus, while I have illustrated and described herein certain preferred embodiments of my invention, it will be understood that I do not intend to be limited thereto. I intend to cover hereby all modifications which fall within the true spirit and scope of my invention.

What I claim as new and desire to secure by Letters Patent of the United States is:

1. Apparatus for handling passengers comprising a vertically elongated self-propelled inverted U-shaped straddle carrier or gantry type truck forming an open pocket, load engaging elevator means depending downwardly in the open pocket, and a portable carrier for passengers which includes a floor portion for supporting the passengers, means at least partially enclosing the space above the floor for the passengers and adapter means extending longitudinally along opposite sides thereof, said straddle carrier being vertically elongated so that the open pocket is of substantially greater height than the height of the portable carrier, said straddle carrier being movable to straddle said portable carrier longitudinally thereof in which position the elevator means is actuated to engage said adapter means and lift the portable carrier to a selected elevation within the open pocket provided by the vertical elongation of the straddle carrier whereby to facilitate entry and exit by passengers in a substantially horizontal plane and at an elevated position within the open pocket, and said straddle carrier being detachable from said portable carrier by lowering the latter to a supporting surface, actuating the elevator means out of engagement with the adapter means and moving the straddle carrier out of straddling relation to the portable carrier.

2. Apparatus as claimed in claim 1 wherein said elevator means comprises a pair of swing hooks actuatable selectively to engage and disengage said adapter means, thereby permitting the straddle carrier to alternately engage and disengage a plurality of portable carriers.

3. Apparatus for handling passengers comprising a mobile self-propelled inverted U-shaped straddle carrier forming an open pocket, load engaging elevator means depending downwardly in the open pocket, and a portable carrier for passengers which includes a floor portion for supporting the passengers, means fully enclosing the space above the floor portion, seating facilities associated with the floor portion, an entry way at one end of the portable carrier and adapter means extending longitudinally along opposite sides thereof, said straddle carrier being movable to straddle said portable carrier longitudinally thereof in which position the elevator means is actuated to engage said adapter means and lift the portable carrier within the open pocket provided by the straddle carrier in order to transport the portable carrier from one location to another, and said straddle carrier being detachable from said portable carrier by lowering the latter to a supporting surface actuating the elevator means out of engagement with the adapter means and moving the straddle carrier out of straddling relation to the portable carrier.

References Cited in the file of this patent

UNITED STATES PATENTS

| D. 146,560 | Dimick | Apr. 8, 1947 |
| 2,379,094 | Maxon | June 26, 1945 |
| 2,410,965 | Dimick | Nov. 12, 1946 |
| 2,462,096 | Hamilton | Feb. 22, 1949 |
| 2,744,581 | Cooper | May 8, 1956 |
| 2,778,674 | Attendu | Jan. 22, 1957 |
| 2,885,242 | Spatta | May 5, 1959 |

FOREIGN PATENTS

| 164,538 | Australia | June 18, 1953 |